United States Patent
Choi et al.

(10) Patent No.: US 8,941,456 B2
(45) Date of Patent: Jan. 27, 2015

(54) EMI SUPPRESSION WITH SHIELDED COMMON MODE CHOKE

(75) Inventors: Hwangsoo Choi, Fullerton, CA (US); Mike Lewis, Orange, CA (US); Shiju Wang, Irvine, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 58 days.

(21) Appl. No.: 13/545,059

(22) Filed: Jul. 10, 2012

(65) Prior Publication Data
US 2013/0069615 A1 Mar. 21, 2013

Related U.S. Application Data

(60) Provisional application No. 61/535,076, filed on Sep. 15, 2011.

(51) Int. Cl.
| | | |
|---|---|---|
| H01F 27/32 | (2006.01) | |
| H01F 27/36 | (2006.01) | |
| H01F 38/30 | (2006.01) | |
| H01F 27/28 | (2006.01) | |
| H02M 1/44 | (2007.01) | |
| H01F 17/00 | (2006.01) | |
| H02M 1/12 | (2006.01) | |
| H01F 17/06 | (2006.01) | |

(52) U.S. Cl.
CPC ............ H01F 27/362 (2013.01); H02M 1/44 (2013.01); *H01F 2017/0093* (2013.01); *H02M 2001/123* (2013.01); *H01F 17/062* (2013.01)

USPC .................... 336/84 R; 336/84 C; 336/84 M; 336/229

(58) Field of Classification Search
USPC .............................. 336/84 R, 84 C, 84 M, 229
See application file for complete search history.

(56) References Cited

U.S. PATENT DOCUMENTS

| | | | |
|---|---|---|---|
| RE18,936 E * | 9/1933 | Wilson ............................ 363/33 |
| 3,964,009 A * | 6/1976 | Bernstein et al. ............... 336/90 |
| 5,825,259 A | 10/1998 | Harphan | |
| 6,950,291 B1 | 9/2005 | Andres | |
| 7,741,798 B2 | 6/2010 | Lucas | |
| 2009/0174330 A1* | 7/2009 | Saveliev et al. ................ 315/82 |

OTHER PUBLICATIONS

QPI-AN1—General Application Note—QPI Family, Rev 2.0; Published Apr. 2005 by Vicor Corporation, Andover MA.
Noise Suppression by EMIFIL Application Guide, downloaded from WWW.Murata.com Aug. 11, 2011; published by Murata Manufacturing Co., Ltd.—Kyoto, Japan.

* cited by examiner

*Primary Examiner* — Tsz Chan
(74) *Attorney, Agent, or Firm* — Simon Kahn

(57) ABSTRACT

A power supply arrangement constituted of: an isolated power supply having a primary side and a secondary side, the secondary side electrically isolated from the primary side; a common mode choke having a first winding and a second winding wound on a common core, the common mode choke coupled between the primary side of the isolated power supply and an AC mains; and a shielding surrounding the common mode choke, the shielding coupled to a common potential of the secondary side of the isolated power supply.

6 Claims, 5 Drawing Sheets

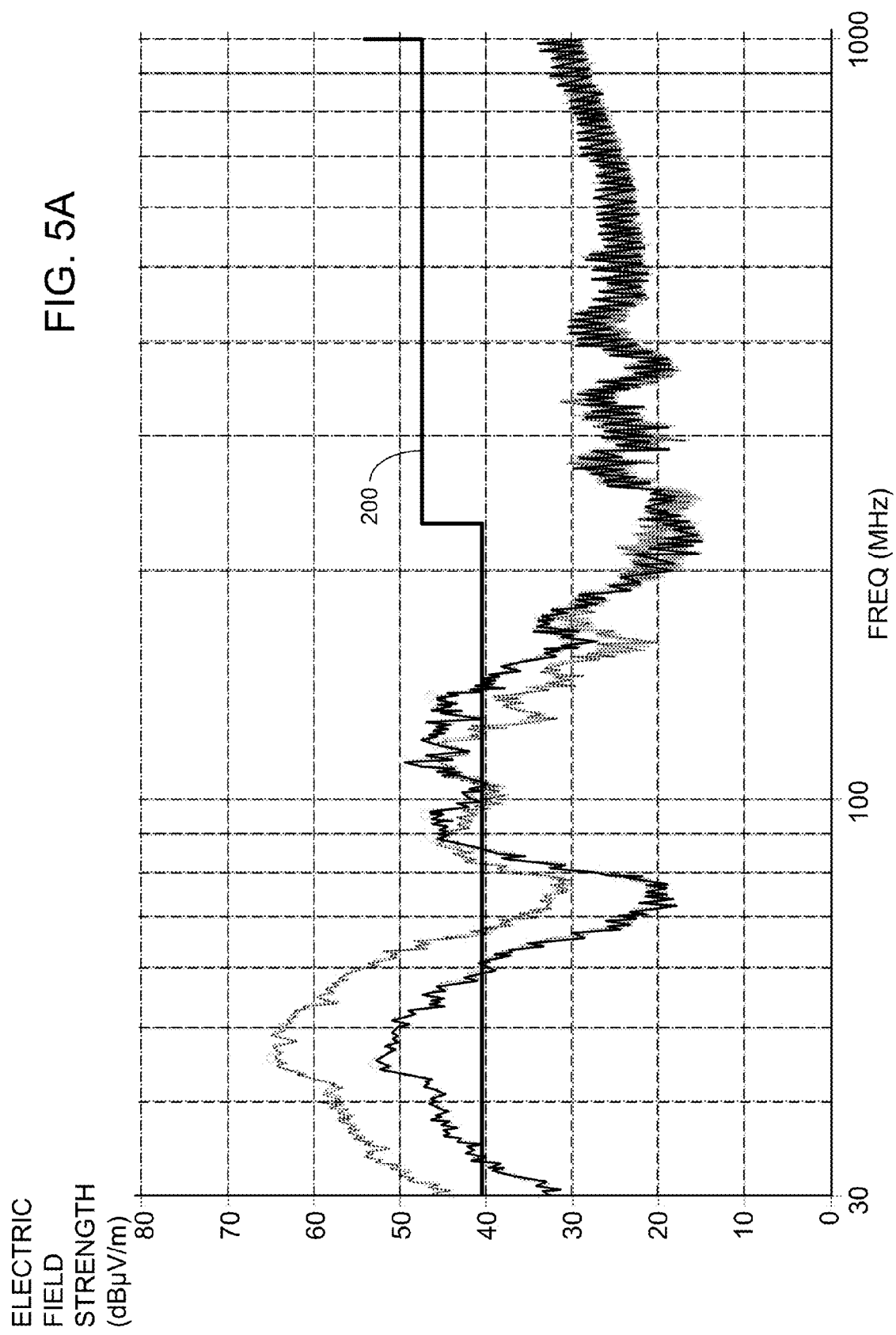

EMI SUPPRESSION WITH SHIELDED COMMON MODE CHOKE

CROSS-REFERENCE TO RELATED APPLICATION

This application claims priority from U.S. Provisional Patent Application Ser. No. 61/535,076 filed Sep. 15, 2011, entitled "EMI SUPPRESSION WITH SHIELDED COMMON MODE CHOKE", the entire contents of which is incorporated herein by reference.

BACKGROUND

The invention relates generally to the field of isolated power supplies, and more particularly to an arrangement providing EMI suppression via a shielded common mode choke coupled to the secondary ground.

Electro-magnetic interference (EMI) also called radio frequency interference (RFI) is a disturbance that affects an electrical circuit due to either electromagnetic induction or electromagnetic radiation emitted from an external source. Broadband interference usually comes from incidental radio frequency emitters, including, but not limited to, electric power transmission lines, electric motors, thermostats, computers and other digital equipment as well as televisions. Any circuit wherein electrical power is turned off and on rapidly is a potential source of EMI. The rich harmonic content of these various devices means that they can produce EMI having a very broad spectrum.

One characteristic of broadband EMI is an inability to filter it effectively once it has entered the receiver chain, and as a result received broadband EMI may interrupt, obstruct, or otherwise degrade or limit the effective performance of the receiving circuit. Most countries have requirements that mandate electromagnetic compatibility: electronic and electrical hardware must still work correctly when subjected to certain amounts of EMI, and the electronic and electrical hardware should not emit EMI of a strength which could interfere with other equipment.

One common method used for suppressing EMI generation by switching power supplies is to utilize common mode chokes as illustrated in FIG. 1 as a power supply arrangement 10. Power supply arrangement 10 comprises: a primary side 20 of an isolated power supply 25; a secondary side 30 of isolated power supply 25; a load 40; and an EMI suppression circuit 45. EMI suppression circuit 45 comprises: a resistor 50; a first and a second capacitor 60; and a first and a second common mode choke 70. A first connection of an AC mains, denoted AC-LINE, is connected to a first end of resistor 50, to a first end of first capacitor 60 and to a first end of a first winding 72 of first common mode choke 70. A second end of first winding 72 of first common mode choke 70 is connected to a first end of second capacitor 60 and to a first end of a first winding 72 of second common mode choke 70. A second end of first winding 72 of second common mode choke 70 is connected to a first input of primary side 20 of isolated power supply 25.

A second connection of the AC mains, denoted AC-NEUTRAL, is connected to a second end of resistor 50, to a second end of first capacitor 60 and to a first end of a second winding 74 of first common mode choke 70. A second end of second winding 74 of first common mode choke 70 is connected to a second end of second capacitor 60 and to a first end of a second winding 74 of second common mode choke 70. A second end of second winding 74 of second common mode choke 70 is connected to a second input of primary side 20 of isolated power supply 25.

Primary side 20 of isolated power supply 25 is coupled to secondary side 30 of isolated power supply 25 in an isolated manner, illustrated without limitation as comprising a transformer. In one particular embodiment, isolated power supply 25 is arranged as a flyback transformer, however this is not meant to be limiting in any way. The output of secondary side 30 is connected to load 40, with the return of each of load 40 and secondary side 30 connected to a common secondary side potential, such as a chassis or ground.

First and second capacitors 60 are thus connected so as to see the input AC line voltage, and as EMI suppression capacitors are thus denoted X capacitors in accordance with EN 60384-14 and IEC 60384-14. Two stages are illustrated, however this is not meant to be limiting in any way, and one stage of EMI suppression may be implemented when EMI is not heavy.

Common mode chokes 70 utilize their inductance to attenuate the switching power noise emanating from isolated power supply 25 from being emitted through the input power line. Unfortunately, common mode chokes 70 exhibit parasitic capacitance between various turns of its constituent wires, i.e. between turns of first winding 72 and between turns of second winding 74 as shown in FIG. 2, which further illustrates a common core 76. The parasitic capacitance allows RF noise to bypass inductance of common mode choke 70. Furthermore, common mode choke 70 acts as an antenna for radiative electromagnetic noise of high frequency. Supplying a shield for common mode choke 70 is ineffective, as the shield itself acts as an antenna for emitting coupled noise. The use of high voltage capacitors between AC mains lines to the secondary common point may be helpful, but high voltage capacitors add significantly to cost.

There is thus a long felt need for an arrangement which provides a reduction in EMI without increasing cost dramatically.

SUMMARY OF THE INVENTION

Accordingly, it is a principal object of the present invention to overcome the disadvantages of prior art EMI suppression arrangements. In particular, a shielded common mode choke is provided, and the shielding is connected directly to the secondary common potential. The shielding is provided isolated from the windings of the common mode choke, thus providing a capacitive coupling between the common mode choke windings and the secondary common potential.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 5A illustrates a plot of EMI for an exemplary power supply utilizing the arrangement of FIG. 3 without connection of the common mode choke shield to the secondary common potential.

DETAILED DESCRIPTION OF THE PREFERRED EMBODIMENTS

Figure 1:
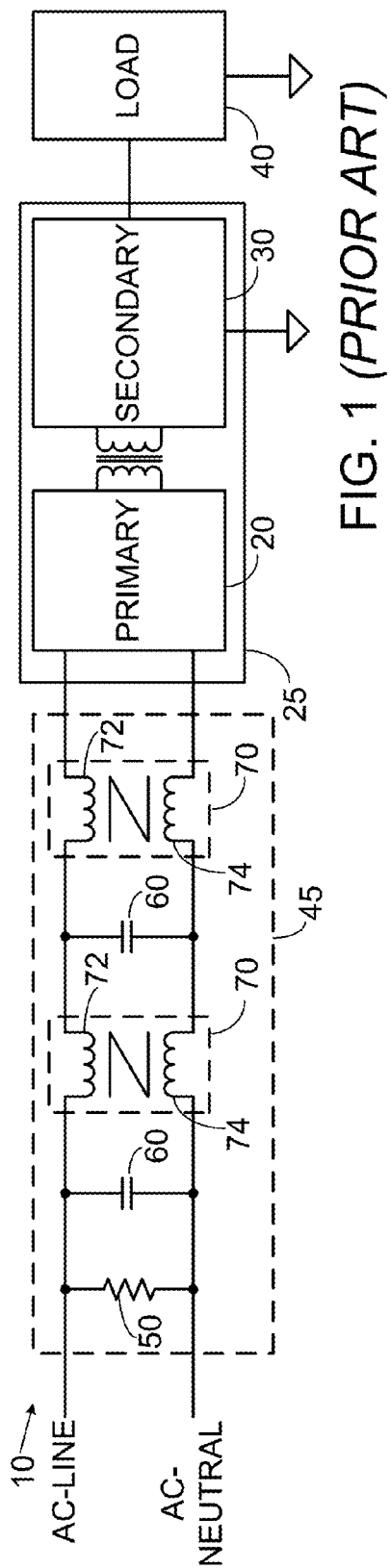
FIG. 1 illustrates a power supply arrangement according to the prior art exhibiting an isolated power supply, a load and an EMI suppression circuit.
Figure 2:
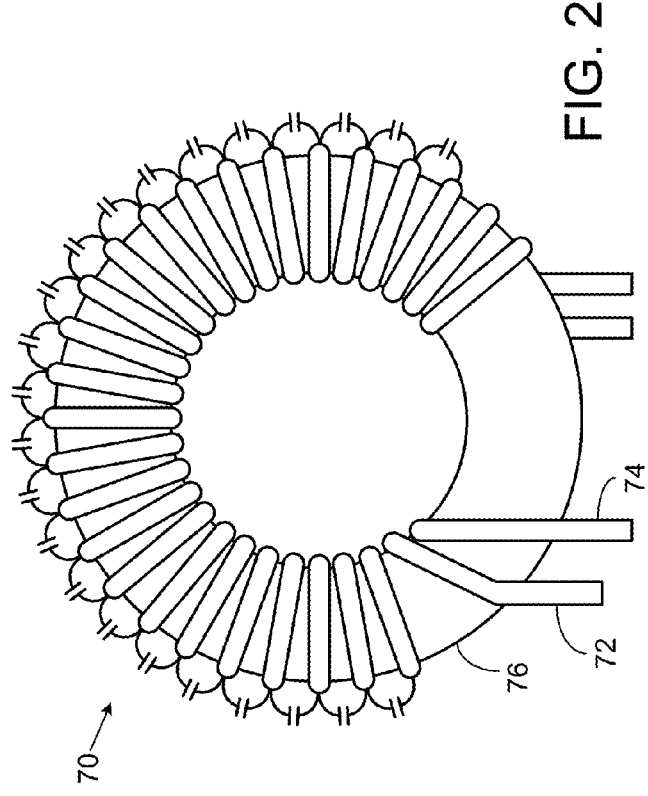
FIG. 2 illustrates a high level schematic diagram of a common mode choke utilized in the EMI suppression circuit of FIG. 1, illustrating parasitic capacitance thereof.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
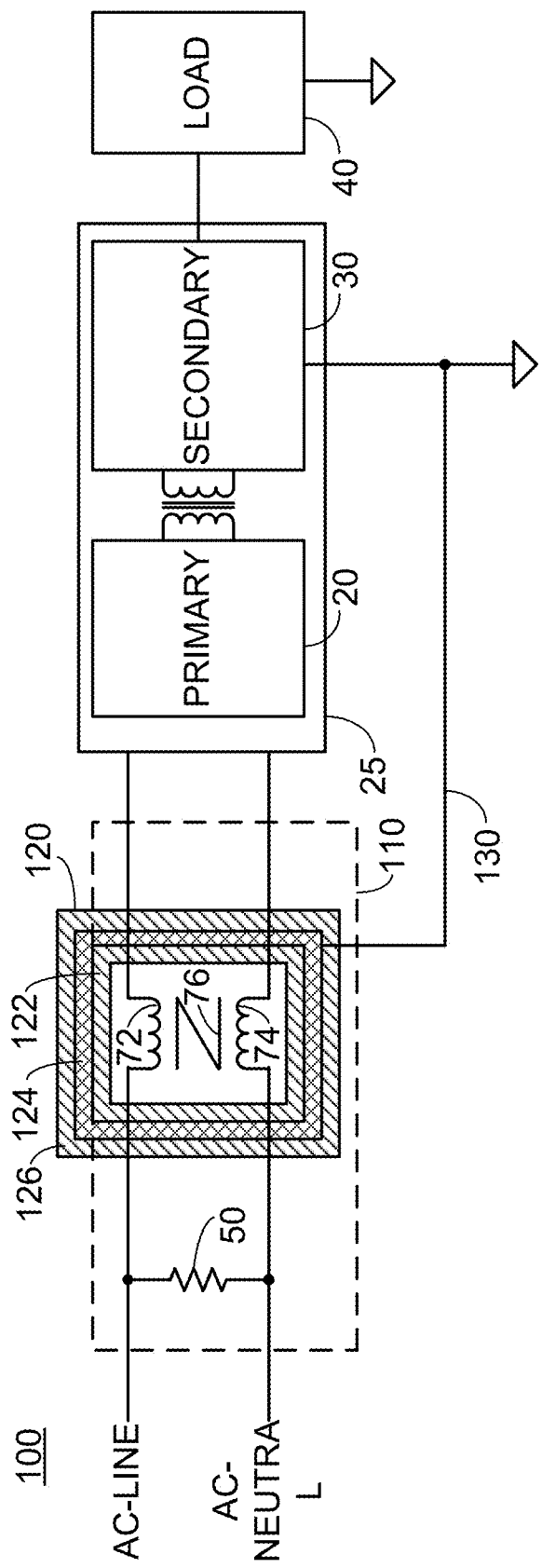
FIG. 3 illustrates a power supply arrangement according to certain embodiments exhibiting an isolated power supply, a load and an EMI suppression circuit wherein the common mode choke is supplied with a shield connected to the secondary side common potential.

FIG. 3 illustrates a power supply arrangement 100 according to certain embodiments comprising: an isolated power supply 25, having a primary side 20 and a secondary side 30; a load 40; and an EMI suppression circuit 110. EMI suppression circuit 110 comprises: a resistor 50; and a shielded common mode choke 120. Shielded common mode choke 120 comprises: a first winding 72; a second winding 74; a common core 76; an inner insulating layer 122; a conducting layer 124; and an outer insulating layer 126. A lead 130 is provided coupled to conducting layer 124.

A first connection of an AC mains, denoted AC-LINE, is connected to a first end of resistor 50 and to a first end of first winding 72 of common mode choke 120. A second end of first winding 72 of common mode choke 120 is connected to a first input of primary side 20 of isolated power supply 25. A second connection of the AC mains, denoted AC-NEUTRAL, is connected to a second end of resistor 50 and to a first end of second winding 74 of common mode choke 120. A second end of second winding 74 of common mode choke 120 is connected to a second input of primary side 20 of isolated power supply 25.

Primary side 20 of isolated power supply 25 is coupled to secondary side 30 of isolated power supply 25 in an isolated manner, illustrated without limitation as comprising a transformer. In one particular embodiment, isolated power supply 25 is arranged as a flyback transformer, however this is not meant to be limiting in any way. The output of secondary side 30 is connected to load 40, with the return of each of load 40 and secondary side 30 connected to a common secondary side potential, such as a chassis or ground. Conducting layer 124 of common mode choke 120 is connected to the common second side potential by lead 130. Conductor layer 124 advantageously provides a capacitive coupling between each of first winding 72 and second winding 74 and the common secondary side potential via lead 130.

Figure 4A:
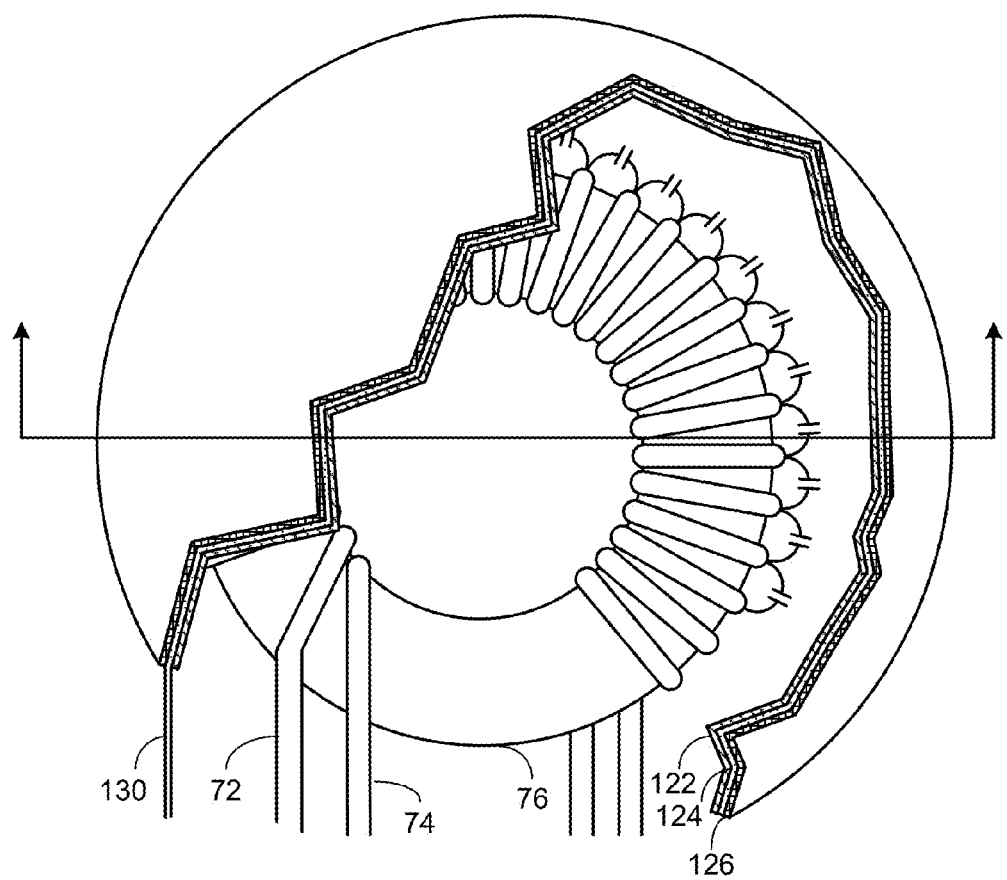
FIG. 4A illustrates a high level partial cut away diagram of an embodiment of a common mode choke utilized in the EMI suppression circuit of FIG. 3.
Figure 4B:
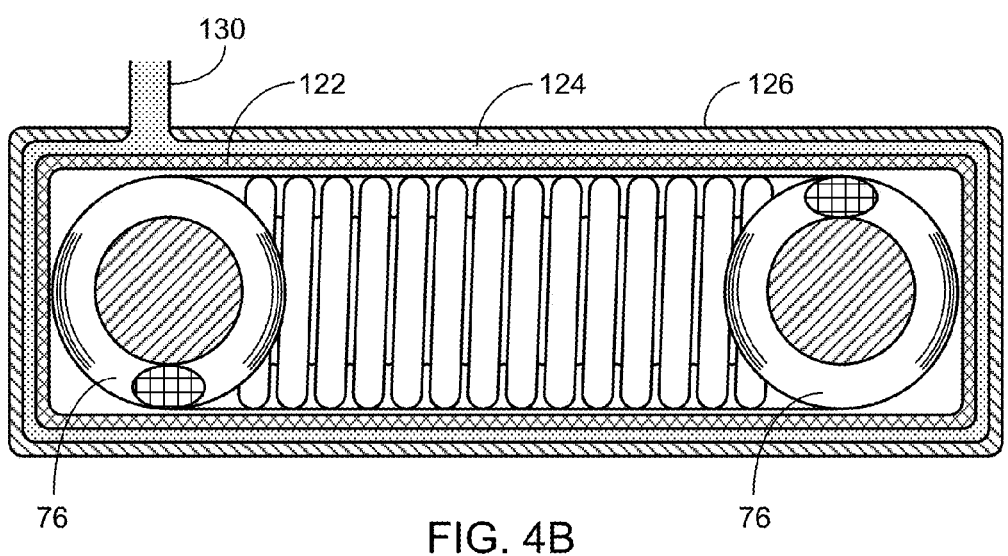
FIG. 4B illustrates a cross sectional view taken along a cut line shown in FIG. 4A of the embodiment of the common mode choke of FIG. 4A.

FIG. 4A illustrates a high level partial cut away diagram of an embodiment of common mode choke 120 and FIG. 4B illustrates a cross sectional view taken along a cut line shown in FIG. 4A of common mode choke 120. For clarity and ease of understanding, the illustrations of common mode choke 120 of FIG. 3, FIG. 4A and FIG. 4B will be taken together. As described above, common mode choke 120 comprises a first winding 72 and a second winding 74, both wrapped about a common core 76. In one embodiment common core 76 is donut shaped, however this is not meant to be limiting in any way. One, or both, of first winding 72 and second winding 74 are preferably covered by an insulating layer so as to prevent short circuits between first winding 72 and second winding 74. Inner insulating layer 122 surrounds wound common core 76, and is preferably in contact with an outer portion of one, or both, of first winding 72 and second winding 74. In one embodiment, inner insulating layer 122 is formed by wrapping wound common core 76 with insulation tape, such as Kapton, available from Dupont Corporation. In another embodiment, inner insulating layer 120 is formed as a container for wound common core 76, by molding or forming an insulating material of sufficient isolation.

Conducting layer 124, which in one exemplary embodiment is comprised of copper foil, is arranged to contactingly surround inner insulating layer 122. A lead 130 is provided coupled to conducting layer 124 so as to provide connection to the secondary side common potential as described above. Outer insulating layer 126, is further provided contactingly surrounding conducting layer 124. In one embodiment, outer insulating layer 126 is formed by wrapping conducting layer 124 with insulation tape, such as Kapton, available from Dupont Corporation. In another embodiment, outer insulating layer 126 is formed as a container for conducting layer 124, by molding or forming an insulating material of sufficient isolation. The above has been described in an embodiment wherein inner insulating layer 122 is in contact with one or one, or both, of first winding 72 and second winding 74; conducting layer 124 is contact with insulating layer 122 and outer insulating layer 126 is in contact with conducting layer 124, however this is not meant to be limiting in any way. Separation may be provided between any adjacent elements without exceeding the scope.

Figure 5B:
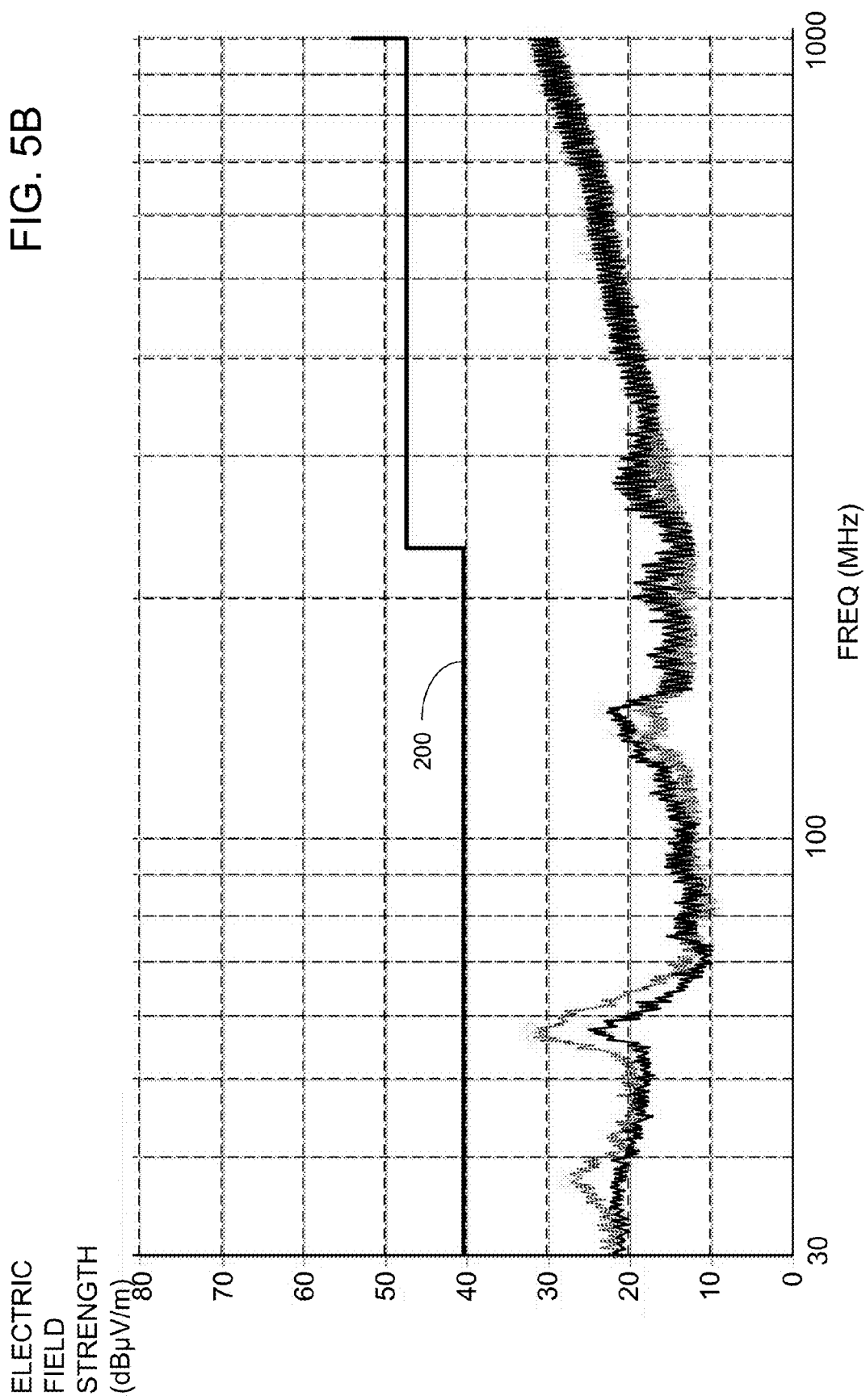
FIG. 5B illustrates a plot of EMI for an exemplary power supply utilizing the arrangement of FIG. 3 with connection of the common mode choke shield to the secondary common potential.

FIG. 5A illustrates a plot of EMI for an exemplary power supply arrangement 10 of FIG. 1, where the x-axis represents frequency in MHz and the y-axis represents electric field strength in dBµV/m. FIG. 5B illustrates a plot of EMI for an exemplary power supply arrangement 100 of FIG. 3, where the x-axis represents frequency in MHz and the y-axis represents electric field strength in dBµV/m. Line 200 denotes the allowable limit of EMI over the frequency range. A comparison of FIG. 5A to FIG. 5B clearly shows a dramatic improvement in EMI for frequencies up to nearly 1000 MHz.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A power supply arrangement comprising:
   an isolated power supply having a primary side and a secondary side, said secondary side electrically isolated from said primary side, such that a common potential of said secondary side is electrically isolated from a common potential of said primary side;
   a common mode choke having a first winding and a second winding wound on a common core, said common mode choke coupled between said primary side of said isolated power supply and an AC mains; and
   a shielding surrounding said common mode choke, said shielding connected to the electrically isolated common potential of said secondary side of said isolated power supply.

2. The power supply arrangement according to claim 1, wherein said isolated power supply is a flyback power supply.

3. The power supply arrangement according to claim 1, wherein said shielding is electrically isolated from each of the first winding and the second winding of said common mode choke, said shielding arranged to provide a capacitive coupling between each of the first winding and the second winding and the common potential of the secondary side of said isolated power supply.

4. A method of electromagnetic interference suppression for use with an isolated power supply having a primary side and a secondary side, the method comprising:
   providing a common mode choke having a first winding and a second winding;
   shielding said provided common mode choke with a shield arranged to substantially surround both the first winding and the second winding; and
   connecting said shield of said provided common mode choke to a common potential of the secondary side of the isolated power supply, said common potential of the secondary side of the isolated power supply electrically isolated from a common potential of the primary side of the isolated power supply.

5. The method of claim 4, wherein said coupling of said shield provides a capacitive coupling between each of the first winding and the second winding of said provided common mode choke and the common potential of the secondary side of the isolated power supply.

6. The method of claim 4, wherein said shield arranged to substantially surround both the first winding and the second winding is electrically isolated from each of the first winding and the second winding of said common mode choke.

* * * * *